Sept. 9, 1958     P. J. KOOLE     2,850,935
ROTATING FASTENER WITH DIVERGING LEG PORTIONS
Filed June 9, 1951

INVENTOR.
Peter J. Koole
BY
Hyde, Meyer, Baldwin & Doran
ATTORNEYS

United States Patent Office 2,850,935
Patented Sept. 9, 1958

2,850,935

ROTATING FASTENER WITH DIVERGING LEG PORTIONS

Peter J. Koole, Bay Village, Ohio, assignor to The Standard Products Company, Cleveland, Ohio, a corporation of Ohio Application June 9, 1951, Serial No. 230,735

5 Claims. (Cl. 85—5)

This invention relates to fasteners.

One of the objects of the present invention is to provide in a fastener of the type described a means for attaching a plurality of members together and locking the fastener to said members.

Another object of the present invention is to provide an inexpensive fastener adapted to be used in quickly assembling a plurality of members and securely locking them together.

Another object of the present invention is to provide a fastener having any of the above advantages and being inexpensively made by a stamping process.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 5 is a horizontal sectional view taken on the line 5—5 of Fig. 3; while

Figure 3:
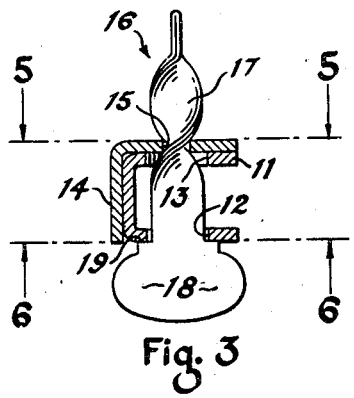
Fig. 3 is a vertical sectional view of the members of Figs. 1 and 2 assembled together by the novel fastener of this invention.
Figure 2:
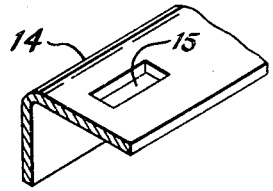
Fig. 2 is a perspective view of an angle bar or member.
Figure 1:
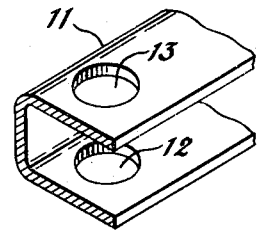
Fig. 1 is a perspective view of a channel member.

While the fastener of this invention might be adapted to hold various types of members together, I have chosen to show the fastener holding a channel bar and an angle bar together. The channel bar member 11 is shown in Fig. 1 and is U-shaped in cross section. This channel bar has two aligned and spaced round apertures 12 and 13. The angle bar is shown at 14 in Fig. 2 and is L-shaped in cross section. It has an elongated slot 15 adapted to align with the round apertures 12 and 13 when the angle bar and channel bar are held together by the fastener as seen in Fig. 3.

Figure 4:
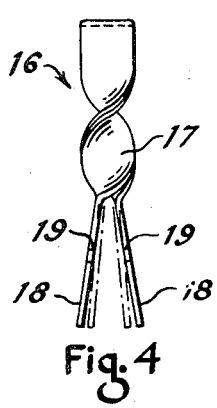
Fig. 4 is a view of the novel fastener with the head portions shown in solid line in their fully extended diverging position and in dot-dash line in a slightly pinched together position.

The fastener is generally indicated at 16. It consists of a shank 17 and an enlarged manipulating head 18. A shoulder 19 exists between the shank and the head just described. The fastener is made by a stamping operation. The fastener consists of a metal strip folded upon itself, as seen in Figs. 3 and 4, to form back to back identical sections. Each section has a shank portion bent in a helical or twisted formation. An enlarged manipulating head portion is on the distal end of the section and the shoulder portion of greater diameter than the round aperture 12 is located between the enlarged manipulating head portion and the shank portion. A straight shank portion, as seen in Figs. 3 and 4, extends between the twisted portion of the shank and the shoulder portion.

Hence, the fastener 16 consists of a shank 17, made up of identical shank portions, and an enlarged manipulating head made up of two head portions. It should be noted that the shank 17, consisting of twisted shank portions and straight shank portions, is made of uniform width material a little smaller than the length of slot 15. This uniform width is necessary so that the fastener shank may be slidably mounted in slot 15 and rotatably mounted in holes 12 and 13. The diameter of holes 12 and 13 is approximately the same as the long dimension of slot 15. Of course, this invention contemplates that the shank need not be of uniform width as long as the shank may slidably fit in the slot and rotatively fit in the apertures 12 and 13.

Figure 6:
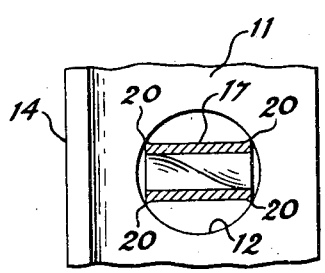
Fig. 6 is a horizontal sectional view taken on the line 6—6 of Fig. 3.
Figure 5:
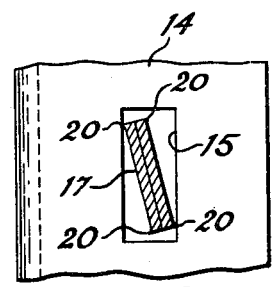

A means is provided to lock the fastener to the members 11 and 14 so that the fastener will not come loose under normal useage. Burrs 20 are provided on the outer edges of each section of the shank 17, as seen in Figs. 5 and 6. The fastener is so fabricated that the original stamping burr occurs on these outer edges. The fastener is fabricated so that the straight portions of shank 17 and the enlarged manipulating head portions of the head 18 are resiliently and divergently biased. The largest divergence is between the distal ends of each section or the outer ends of each head portion. The divergently or outwardly biased straight shank portions with their burrs 20 engage the bore of hole 12, as seen in Fig. 6, to lock the fastener and members 11 and 14 in assembled relationship. Although burrs 20 are shown in Fig. 5 on the twisted shank portions since these burrs were also formed in the stamping operation, it should be clear that these burrs could be omitted if desired. However, the burrs in Fig. 5 do help to keep the fastener and members in assembled relationship but the essential burrs are those in Fig. 6 which engage the bore of hole 12.

The shank 17 is shown as made up of twisted shank portions and straight shank portions, the latter adapted to engage the bore of hole 12, as seen in Figs. 3 and 6. This invention also contemplates that the whole shank might have a helical twist right up to the shoulder 19, if desired, as long as the shank portions adjacent the shoulder 19 are sufficiently resilient and divergent to engage the bore of round aperture 12, as seen in Fig. 6.

The operation of this novel fastener should be apparent. To apply the fastener, one would merely grip the portions of head 18 and pinch them together, insert the shank 17 through holes or apertures 12 and 13 and elongated slot 15, rotate the head 18 so as to rotatably advance the helical or twisted formation on the shank 17 through the slot 15 until shoulder 19 engaged the outer surface of the channel bar 11 surrounding the round aperture 12. This operation would pull the channel bar 11 and angle bar 14 snugly together. Then, when the portions of head 18 were released, the resiliency and diverging tendency of the two sections of the fastener would cause the burrs 20 to engage in the bore of round aperture 12 of Fig. 6. The fastener 16 may also be readily removed to separate channel bar 11 and angle bar 14. The portions of head 18 are squeezed so as to release the biting grip between burrs 20 and the bore of aperture 12. Then, the fastener 16 is rotated so as to withdraw the shank 17 from the slot 15 and the apertures 12 and 13.

Although the drawings disclose a channel bar 11 connected to an angle bar 14, the invention contemplates the assembly of a plurality of members, as long as one member has a slot and another one has an aperture. For example, a plurality of plates could be assembled together if each had an aperture to fit over the fastener 16. The outside plate on one end would have to have a slot similar to elongated slot 15 while the plate member on the other end would have to have a round aperture similar to round aperture 12. The plates between would need an aperture similar to aperture 13 to attach them to the shank of the fastener. The aperture in each of the plates between would have to have enough clearance so that the fastener could be rotatably mounted therein.

Various changes in details and arrangement of parts can be made by one skilled in the art without departing from the spirit of my invention or the scope of the appended claims.

What I claim is:

1. A sheet metal fastener for attaching together a plurality of members having an aperture of slotted form and an aligned aperture of rounded form and wherein said fastener, for attaching purposes, is inserted through said rounded aperture before being inserted through said slotted aperture, said fastener having a rigid shank portion of spiral form which is adapted to be located beyond said slotted aperture in the attaching position of said fastener and which fastener also has two laterally aligned portions which have a normal tendency to diverge and which are adapted to be located in said rounded aperture in the attaching position of said fastener.

2. A sheet metal fastener for attaching together a plurality of members having an aperture of slotted form and an aligned aperture of rounded form and wherein said fastener, for attaching purposes, is inserted through said rounded aperture before being inserted through said slotted aperture, said fastener having a shank portion of spiral form which is adapted to be located beyond said slotted aperture in the attaching position of said fastener and which fastener also has two laterally aligned portions which have a normal tendency to diverge and which are adapted to be located in said rounded aperture in the attaching position of said fastener, said laterally aligned portions being provided with outwardly extending burrs on the edges thereof to assist in the releasable retention of such portions in said rounded aperture.

3. A one piece sheet metal fastener for attaching together a plurality of members having an aperture of slotted form and an aligned aperture of rounded form and wherein said fastener, for attaching purposes, is inserted through said rounded aperture before being inserted through said slotted aperture, said fastener having a rigid shank portion of spiral form which is adapted to be located beyond said slotted aperture in the attaching position of said fastener and which fastener also has two laterally aligned portions which have a normal tendency to diverge and which are adapted to be located in said rounded aperture in the attaching position of said fastener and which fastener also has a portion of greater cross dimensional size than that of said rounded aperture, to thereby limit the extent to which said fastener can be inserted through said rounded aperture.

4. A sheet metal fastener for attaching together a plurality of members having an aperture of slotted form and an aligned aperture of rounded form and wherein said fastener, for attaching purposes, is inserted through said rounded aperture before being inserted through said slotted aperture, said fastener being reversely bent intermediate its ends to provide a two part shank portion with its parts in back to back engagement and which shank portion is of rigid spiral form, and which is adapted to be located beyond said slotted aperture in the attaching position of said fastener, and to also provide two laterally aligned portions which have a normal tendency to diverge and which are adapted to be located in said rounded aperture in the attaching position of said fastener.

5. A sheet metal fastener for attaching together a plurality of members having an aperture of slotted form and an aligned aperture of rounded form and wherein said fastener, for attaching purposes, is inserted through said rounded aperture before being inserted through said slotted aperture, said fastener comprising a strip of sheet metal which is reversely bent intermediate its ends and which is provided at its free ends with enlarged manipulating portions, the parts of the fastener adjacent said bend being in back to back relationship and being of spiral and rigid form and being adapted to be located beyond said slotted aperture in the attaching position of said fastener, the fastener adjacent its manipulating portions having two laterally aligned parts which have a normal tendency to diverge and which are adapted to be located in said rounded aperture in the attaching position of said fastener.

References Cited in the file of this patent

UNITED STATES PATENTS

| | | |
|---|---|---|
| 1,873,871 | Carr | Aug. 23, 1932 |
| 2,068,932 | Quarnstrom | Jan. 26, 1937 |
| 2,077,120 | Lombard | Apr. 13, 1937 |
| 2,173,524 | Van Uum | Sept. 19, 1939 |
| 2,334,676 | Jones | Nov. 16, 1943 |
| 2,542,968 | Zahodiakin | Feb. 20, 1951 |
| 2,584,813 | Poupitch | Feb. 5, 1952 |
| 2,595,095 | O'Connor | Apr. 29, 1952 |
| 2,608,735 | Poupitch | Sept. 2, 1952 |